No. 613,508. Patented Nov. 1, 1898.
S. S. GOLDMAN.
BICYCLE BRAKE.
(Application filed Apr. 21, 1897.)
(No Model.)
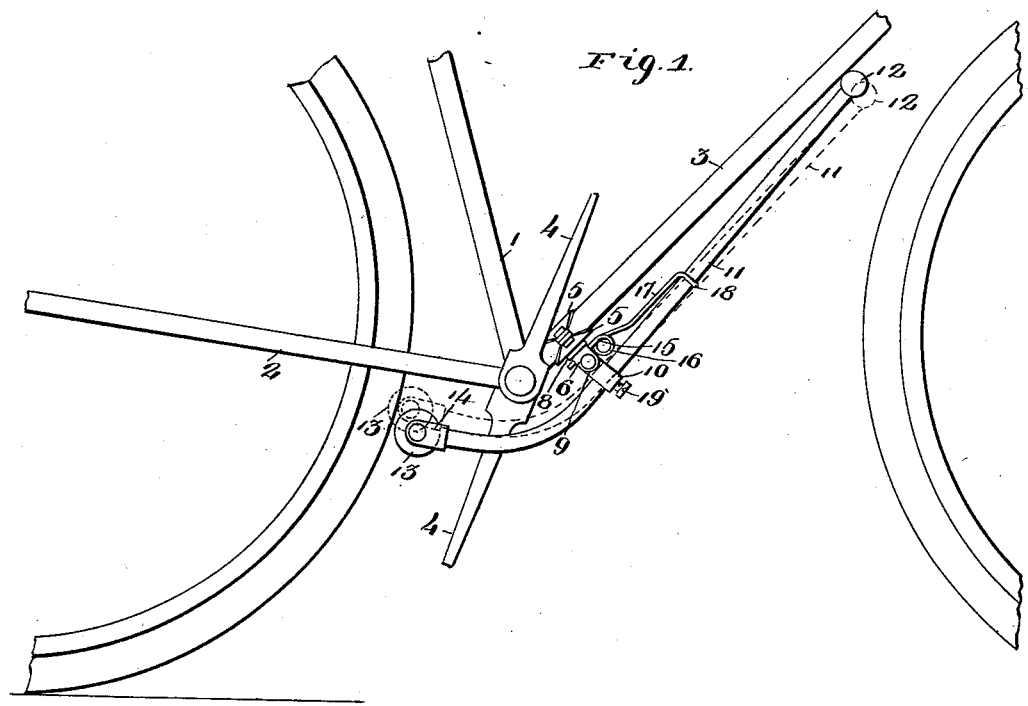
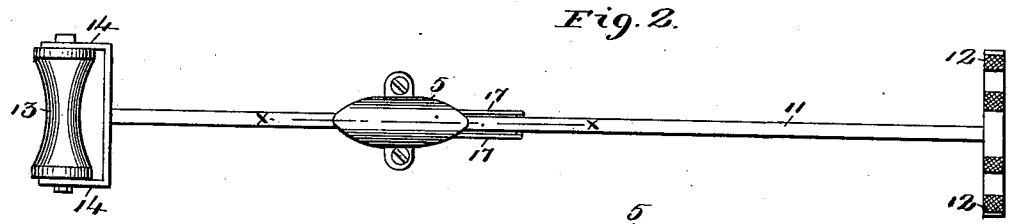
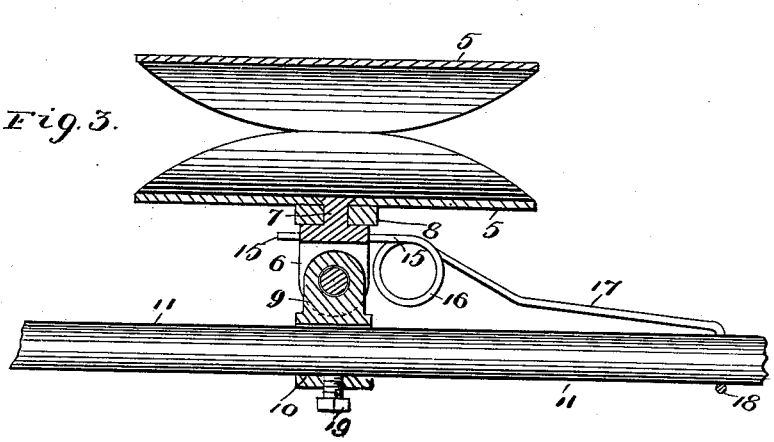

UNITED STATES PATENT OFFICE.

SAMUEL S. GOLDMAN, OF ST. LOUIS, MISSOURI, ASSIGNOR OF ONE-HALF TO FRED F. ESPENSCHIED, OF SAME PLACE.

BICYCLE-BRAKE.

SPECIFICATION forming part of Letters Patent No. 613,508, dated November 1, 1898.

Application filed April 21, 1897. Serial No. 633,185. (No model.)

*To all whom it may concern:*

Be it known that I, SAMUEL S. GOLDMAN, a citizen of the United States, residing at St. Louis, State of Missouri, have invented certain new and useful Improvements in Bicycle-Brakes, of which the following is a full, clear, and exact description, reference being had to the accompanying drawings, forming a part hereof.

My invention has relation to improvements in bicycle-brakes; and it consists in the novel arrangement and combination of parts more fully set forth in the specification and pointed out in the claims.

In the drawings, Figure 1 is a side elevation of a portion of a bicycle with the brake attached. Fig. 2 is a top plan view of the brake detached, and Fig. 3 is an enlarged vertical section on the line $x\ x$ of Fig. 2.

The object of my invention is to construct a bicycle-brake which can be readily controlled by the operator, one which is simple in construction, one specially applicable to the rear wheel of a bicycle, one which is readily adjustable according to the size of the frame, one whose action is positive, and one possessing further and other advantages apparent from a detailed description of the device, which is as follows:

Referring to the drawings, 1 represents the saddle-post of a bicycle-frame, 2 the rear fork, and 3 the member which connects with the front fork of the machine.

4 are the pedal-arms.

Adapted to be secured to the member 3 by means of clamping-plates 5 is a fork 6, having a central stem 7, by which it is connected to the lower clamping-plate 5, a disk or plate 8 being interposed between the plate 5 and the base of the fork to insure stiffness to the parts. Between the members of the fork is pivoted a block 9, adapted to swing in the plane of travel of the machine, the free end of the block being provided with a loop or opening 10 for the reception of the brake-lever 11, the forward end of which is provided with foot-rests 12, by which the same may be depressed. At the free end of the rear curved extension of the lever is mounted a roller-brake 13, the same having its bearings between the arms 14, with which the end of said extension is provided. Passing through and carried by the base of the fork 6 are the arms 15, each forming the continuation of a resilient loop or spring 16, the loop being continued in the opposite direction in the shape of an arm 17, provided with a terminal hook or depression 18, which embraces the lever 11, the tendency of the spring being to force the lever 11 toward the member 3, and thus keep the roller-brake 13 off the tire of the rear wheel. A screw 19 retains the lever 11 within the loop of the oscillating block 9 in any position to which it may have been adjusted along the same.

It is apparent that upon depressing (by means of the foot of the rider) the forward end of the lever 11, as indicated by the dotted position of the parts in Fig. 1, the roller-brake 13 will be forced against the tire and the machine will come to a stop. The lever 11 being adjustable within the loop 10, it is apparent that the parts may be adjusted according to the size of the frame of the wheel and according to the position at which the brake is to be applied along the tire of the wheel.

It is apparent that minor changes might be made without departing from the spirit of my invention.

Having described my invention, what I claim is—

1. In a bicycle-brake, a suitable lever adapted to be tilted by the rider, a block pivotally suspended from the frame of the machine, means for adjustably securing the lever to the block, and a brake carried by said lever and adapted to contact with the tire of the rear wheel of the machine upon the tilting of the lever in one direction, substantially as set forth.

2. A bicycle-brake comprising a lever, a block pivotally suspended from the frame of the machine, a loop forming a part of said block for the reception of the aforesaid lever, a clamp adapted to be secured to the frame of the machine, a fork carried by the clamp, the said block being pivotally secured to the fork and adapted to oscillate in the plane of travel of the machine, a spring-loop having one arm or extension secured to the fork, and a second arm extending in the opposite direction to the first and having a terminal hook embracing the lever, a rear curved extension forming a part of the lever, and a roller-brake carried at the end of the curved extension and adapted to contact with the tire of the rear wheel upon the depression of the forward end of the lever, substantially as set forth.

In testimony whereof I affix my signature in presence of two witnesses.

SAMUEL S. GOLDMAN.

Witnesses:
EMIL STAREK,
LEE SALE.